UNITED STATES PATENT OFFICE.

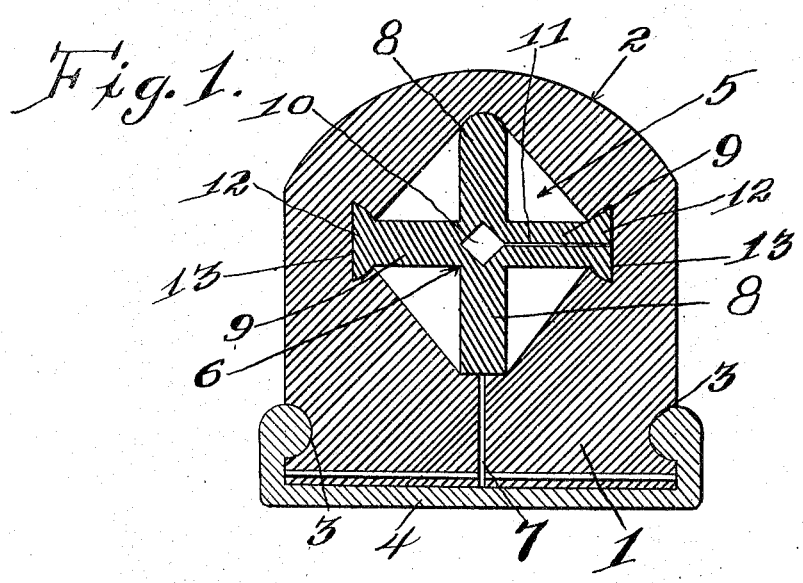
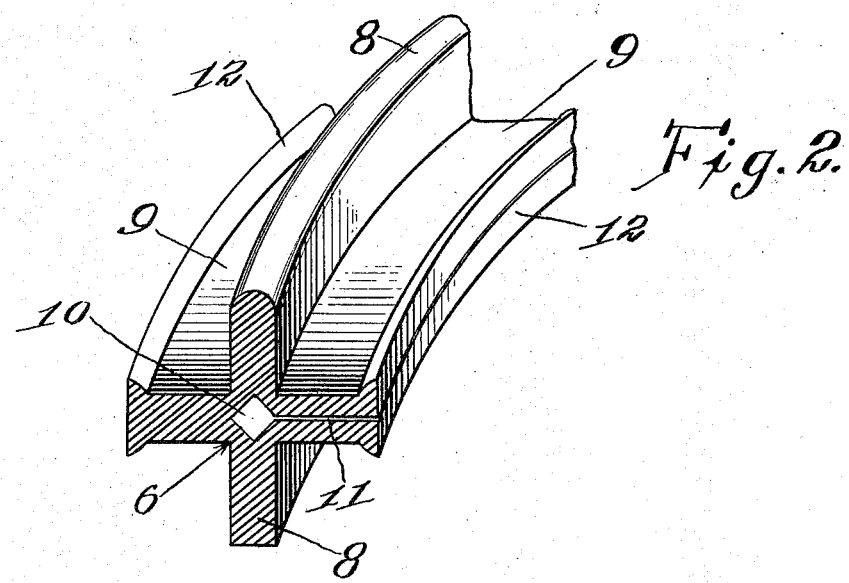

JOSEPH A. MOLLITOR, OF CHICAGO, ILLINOIS.

CUSHION-TIRE.

981,213.  Specification of Letters Patent. Patented Jan. 10, 1911.

Application filed February 28, 1910. Serial No. 546,496.

*To all whom it may concern:*

Be it known that I, JOSEPH A. MOLLITOR, a citizen of the United States, residing at Chicago, in the county of Cook and State of Illinois, have invented certain new and useful Improvements in Cushion-Tires, of which the following is a specification.

My invention relates to a new and useful improvement in resilient tires for vehicle wheels, but more particularly to a cushion tire.

The principal object of my invention comprehends the production of a device of the above character which will have all of the advantages of a pneumatic tire as to elasticity, and at the same time remedy the objections to such a tire in that my tire will be strong and durable as well as puncture proof, and can also be manufactured at considerable less expense than the usual pneumatic tire.

A further object of my invention is to provide a cushion tire having but a single core of such construction that it may be anchored in place within the casing or main part of the tire, but still yield freely in both directions when pressure is exerted on the tread of the tire.

In the accompanying drawings, which form a part of this specification, and in which like reference numerals indicate corresponding parts throughout the several views, Figure 1 is a transverse sectional view of a tire constructed in accordance with my invention. Fig. 2 is a perspective view of a portion of the cushioning core.

Referring specifically to the drawings, 1 indicates the casing of my tire, which is provided with the usual convex tread surface 2, and the side grooves 3 for receiving the edges of the felly or rim 4. The casing 1 may be formed entirely of rubber or rubber composition, or it may be provided with reinforcing strips of canvas, as desired. In molding the casing 1 it is formed with a centrally extending opening 5, which extends throughout the entire length of the tire. This opening is in the form of a diamond and is adapted to receive the cushioning core 6. To permit the removal of that part of the mold which forms the opening 5, the casing is left open, as at 7. This also allows the core 6 to be easily placed within the opening 5. The core 6 is also formed in a single piece, and may be made of either rubber or rubber composition. As shown in the drawings, the core 6 is formed with vertical and horizontal webs 8 and 9 respectively, and has formed centrally therein an opening 10, which saves material and at the same time increases the flexibility of the core. One of the horizontal webs of the core is left open, as at 11, for the purpose of removing the core of the mold which forms the opening 10. The free ends of the horizontal webs 9 are enlarged as at 12, and said enlargements 12 are adapted to fit into corresponding recesses 13 formed in the sides of the casing 1, at the angles of the opening 5 on a line with the horizontal center of the casing 1. The free ends of the vertical webs 8 are adapted to rest in the angles of the opening 5 on a line with the vertical center of the casing 1. As the tread surface 2 of the casing 1 comes in contact with the ground, the weight of the vehicle on the tire will cause the casing to compress, its vertical diameter shortening and its horizontal diameter lengthening. By constructing the tire in accordance with my invention, the vertical pressure on the casing 1 will be taken up or cushioned by the vertical webs 8, and the horizontal webs 9 will at the same time stretch to take up the pressure in the horizontal direction, and as the horizontal webs 9 are securely anchored in the casing 1 the core 6 will always remain in its proper position.

From the foregoing it will be seen that I provide a cushion tire which while being extremely simple of construction, will be strong and durable, and will effectually serve the purpose for which it is intended.

I claim:

A cushion tire, comprising a main casing having an opening formed centrally therein, and a cushioning core arranged within said opening, said core having webs extending in opposite directions to each other, certain of said webs having enlargements formed at the ends thereof, and recesses formed in the sides of the aforesaid casing for receiving said enlargements, to retain the core in place.

In testimony whereof I affix my signature in presence of two witnesses.

JOSEPH A. MOLLITOR.

Witnesses:
ARTHUR WESLEY,
W. HARDING.